Oct. 5, 1965  RYOSUKE TOYODA ETAL  3,210,761
PATTERN DISPLAYING SYSTEM
Filed April 20, 1961
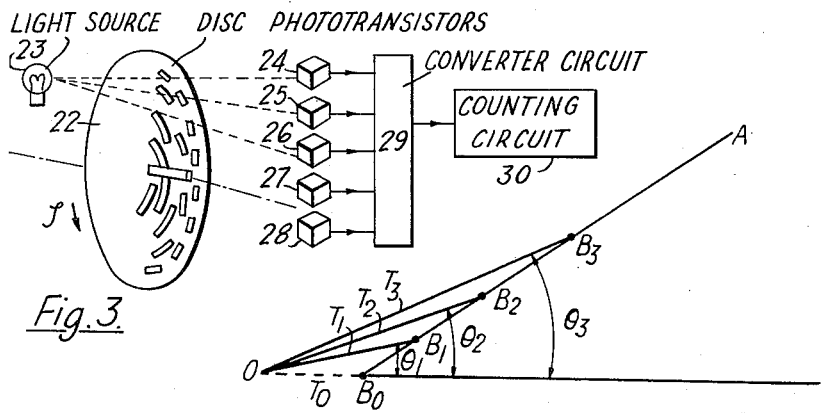
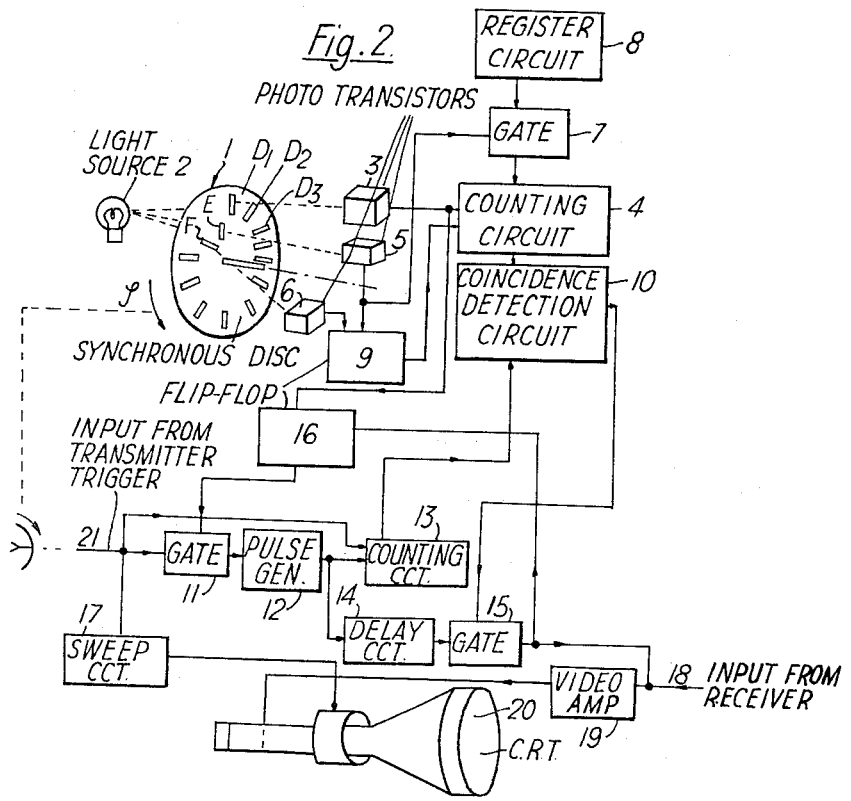
Inventor
RYOSUKE TOYODA
YASUTOSHI ISHIZAKI
By *R. P. Morris*
Attorney

3,210,761
PATTERN DISPLAYING SYSTEM

Ryosuke Toyoda and Yasutoshi Ishizaki, Tokyo, Japan, assignors to Nippon Electric Company, Limited, Tokyo, Japan, a corporation of Japan
Filed Apr. 20, 1961, Ser. No. 104,409
Claims priority, application Japan, Apr. 22, 1960, 35/22,484
5 Claims. (Cl. 343—11)

This invention relates to an improvement in pattern display systems such as those applied to radar indicators and the like.

When the marker pattern of a glide path is displayed on the indicator of radar equipment (such as the precision approach radar of ground controlled approach systems) the marker pulse is applied to the control grid or cathode of the cathode-ray tube after a time interval, which depends upon the azimuth or elevation angle of the antenna, from the start of the sweep of the indicator.

In conventional equipment the above mentioned time interval is dependent on the delay time of the marker pulse signals. These signals are generated in combination with a saw-tooth sweep wave and a D.C. angle voltage which are dependent on the antenna attitude. It has been found, however, that this time interval is inaccurate due to, among other things, the non-linearity of the saw-tooth wave. Consequently, the pattern on the cathode-ray tube is incorrect and frequent adjustment is necessary.

The object of this invention is to synchronize the generation of the marker pulse signals with the attitude of a radar antenna so that these signals, when applied to a cathode-ray tube, correctly display a predetermined pattern, with little or no subsequent adjustments being necessary.

The above-mentioned and other features and objects of this invention and the manner of attaining them will become more apparent and the invention itself will be best understood by reference to the following description of an embodiment of the invention taken in conjunction with the accompanying drawings.

FIG. 1 shows an example of a pattern to be displayed on a cathode-ray tube;

FIG. 2 shows schematically an embodiment of the invention whereby this pattern may be correctly displayed; and FIG. 3 shows schematically a modification of the embodiment of FIG. 2.

FIG. 1 shows the pattern to be displayed on the height indicator of a precision approach radar of a ground-controlled approach system. Line A is the glide path to be displayed, and O is the origin on the cathode-ray tube which corresponds to the position of the antenna. The points on the glide path corresponding to the scanning angles $\theta_1, \theta_2, \theta_3 \ldots$ of the antenna, are respectively $B_1, B_2, B_3 \ldots$. The actual time required for the electromagnetic waves to make complete round trips in air which correspond respectively to the lines $OB_1, OB_2, OB_3 \ldots$ can be designated $T_1, T_2, T_3 \ldots$ respectively. In order for $B_1, B_2, B_3 \ldots$ to correctly display the descending path A, it is necessary for the marker pulses to be applied to the control grid or cathode of the cathode-ray tube after the elapse of time $T_1, T_2, T_3 \ldots$ from the beginning of the sweep of the cathode-ray tube, in response to the scanning angle of the antenna. If $\theta_1, \theta_2, \theta_3 \ldots$ are chosen so that the difference between $T_1, T_2, T_3 \ldots$ is a constant, $\tau$, then $\theta_1, \theta_2, \theta_3, \ldots$ will be defined by the given position, the angle of the glide path and the chosen time difference $\tau$.

This time difference $\tau$ will be used hereinbelow to represent a unit time value.

FIG. 2 shows an embodiment of the invention in which the pulse generating time is synchronized with the scanning angle of the antenna and the corresponding cathode-ray tube. Disc 1, with slits $D_1, D_2, D_3 \ldots$ is interlocked with the beam scanning axis by conventional means such as gears, servos, etc., diagramatically indicated by the dashed lines. Its rotary angle $\varphi$ is a multiple of the scanning angle of the antenna and the cathode-ray tube 20.

The slits $D_1, D_2, D_3 \ldots$ are positioned so that the photo-transistor 3 is exposed to the beam of the electric light 2, as the disc 1 rotates by amounts corresponding to the scanning angle $\theta_1, \theta_2, \theta_3 \ldots$ of the antenna. Thus, if the antenna is scanning in the positive angular direction a pulse will be generated by the photo-transistor 3 when each of the scanning angles $\theta_1, \theta_2, \theta_3 \ldots$ are passed. These pulses are counted in the counting circuit 4. If the counted value is $n$, the marker pulse necessary for displaying that particular point of the pattern A is applied to the control electrode of the cathode-ray tube $T_0+n(\tau)$ after the start of the sweep where $T_0$ is the delay time for the marker pulse corresponding to $OB_0$ (a scanning angle of 0° in FIG. 1).

Register circuit 8 is necessary for insuring that $T_0/\tau=n_0$ where $n_0$ is the initial value set in the counting circuit. The value $n_0$ is dependent on the delay time, $T_0$ corresponding to the scanning angle of 0°. When the scanning angle of the antenna is 0°, the photo-transistor 5 will be exposed to the light from source 2, through the slit E. The output from photo-transistor 2 opens gate 7 and transfers the content of the register circuit 8 ($n_0$) to the counting circuit 4. If the counting circuit 4 then counts $n$ pulses, from the photo-transistor 3, the content of this circuit will be $n_0+n$. Thus the necessary delay time $(n_0+n)\tau$ for the marker pulse will be obtained. The number in the counting circuit 4 is reduced by one each time the scanning angle of the antenna becomes . . . $\theta_3, \theta_2, \theta_1$. This reduction is achieved by the corresponding pulse from the photo-transistor 3, when the antenna is scanning downwards. The number in the counting circuit 4 thus always is that multiple of $\tau$ which represents the delay time from the start of the sweep of the cathode-ray tube to the time when the marker pulse is to be applied. For this purpose, the disc 1 is equipped not only with the slits $D_1, D_2, D_3 \ldots$ but also slits E and F. As mentioned above, slit E is positioned to expose photo-transistor 5 to the beam of the electric lamp 2, when the antenna scans the lowest point (0°). Slit F is positioned to expose the photo-transistor 6 to the beam of the electric lamp 2, when the antenna scans the highest point. It should be noted that slits E and F will permit a light pulse to pass to photo-transistors 5 and 6 once during each rotation of disc 1. The disc 1 will rotate as indicated in FIGURE 2 when the angle of beam scanning is as indicated (from 0° toward the maximum). However, disc 1 will rotate in the opposite direction when the direction of beam scanning is in a reversed sense. The output of photo-transistors 5 and 6 are connected to the flip-flop circuit 9, which is responsive to the signals from each of said transistors. Thus flip-flop circuit 9 is alternatively switched as the antenna scans in either the up- or down direction. The counting circuit 4 is controlled in response to the state of the flip-flop circuit 9 so that a value can be added or subtracted, when the circuit receives a pulse from the photo-transistor 3.

The trigger from the transmitter is applied to the sweep circuit 17, through input terminal 21, to start the sweep of the cathode-ray tube 20. The same trigger is also applied to the gate circuit 11, which is controlled by the flip-flop circuit 16. Flip-flop circuit 16 is connected to normally allow the gate circuit 11 to pass signals therethrough. This is achieved by means of pulses from photo-transistor 3. Any pulse from gate 15 which appears thereafter will invert flip-flop 16 and close gate 11. Thus, pulses from the input terminal 21 will be connected to pulse generator 12 only when gate circuit 11 is gated "ON." With receipt of the trigger pulse from the terminal 21, the pulse generator 12 generates a pulse precisely every $\tau$ time interval of the maximum sweeping time of the cathode-ray tube.

The output pulse series of the pulse generator 12 is applied to the counting circuit 13. The counting circuit 13 also is connected to the input 21 and is reset to zero by each trigger pulse. A coincidence detection circuit 10 produces an output, when the contents of the counting circuit 4 and 13 are equal. Since the counting circuit 13 adds one after each $\tau$ time interval after the start of the sweep of the cathode-ray tube, the values counted by the counting circuits 4 and 13 are equal to each other only $(n_0+n)$ seconds after the beginning of a sweep. The output of the coincidence detection circuit 10 controls gate circuit 15 to admit therethrough only one pulse of the pulse series generated by generator 12. This pulse from generator 12 passes through a delay circuit 14 which compensates for the delay of the counting circuit etc. This pulse is added to the video signal supplied to the input terminal 18, from the receiver, by means of the video amplifier 19, which in turn is connected to the control electrode of the cathode-ray tube to form the required marker.

The output of the circuit 15 is also applied to the flip-flop circuit 16, which is then inverted. The gate 11 is consequently closed to prevent the marker from being generated until a pulse comes from the photo-transistor 3. This circuit, which permits only one marker pulse when the value of the counting circuit 4 is constant, is necessary to display the required pattern as dotted lines rather than steps.

If the patterns are to be displayed in steps, or the output of the amplifier 19 is to be used as the gate signal for the brightness control as will be described hereinafter, the flip-flop circuit 16 and the gate 11 are unnecessary and can be deleted.

As described above, the function of the mechanism represented by reference numerals 1, 2, 3, 4, 5, 6, 7, 8, and 9 is to make the content of the counting circuit, corresponding to the scanning angle of the antenna, have a value which indicates the multiple required for the unit time $\tau$, the delay time between the beginning of the sweep and the time when the marker pulse is generated. This mechanism may be modified as shown in FIG. 3.

Disc 22 has a rotary angle $\varphi$ which is a multiple of the scanning angle of the antenna, as was the case for disc 1 of FIG. 2. It is equipped with the slits which indicate the multiple of the $\tau$ time interval from the start of the sweep of the cathode-ray tube to the generation of marker pulse. The above value is to be expressed in this embodiment in terms of an alternating binary-scale signal. The photo-transistors 24, 25, 26, 27, and 28 are exposed in predetermined combinations to the light from source 23, and thus their outputs which will be an alternating binary scale figure, will indicate the multiple of $\tau$ (the time up to the generation of marker pulse). The outputs from photo-transistors 24–28 are supplied to the converting circuit 29 which transforms the above signals into a pure binary code. The output of 29 when supplied to the counting circuit 30 will have the same effect as the counting circuit 4 in FIG. 2.

As described the slitted disc and photo-transistors are used to convert the scanning angle of the antenna and the cathode-ray tube into a value which indicates the time up to the generation of marker pulse. The same effect may also be obtained by a commutator and brushes, or where the patterns corresponding to the slits are painted on the disc, the reflected light beams can be received by the photo-transistors.

Although the above description is taken with reference to the ground-controlled approach system, this pattern display system is not restricted thereto. For general marker patterns, the time for generation of the marker will not necessarily increase as mentioned above when the antenna is scanned in one direction, rather it may increase and decrease with unidirectional scanning of the antenna. In such a case, the positioning of the slits E and F in FIG. 2 could be changed. They could be separated to change the counting circuit into an addition or subtraction system. The embodiment of FIG. 3, could be used as is, for this purpose if the slits of the disc are modified.

The output of the coincidence detection circuit 10 may control other gate circuits, for example, a gate circuit for the brightness control of the cathode-ray tube, i.e. the blanking gate circuit, and can thereby prevent the image outside a definite range from appearing on the cathode-ray tube, or on the other hand it can make only the image outside a definite range appear on the cathode-ray tube. If several units are used, the images may be sectioned within and without predetermined ranges.

While we have described above the principles of our invention in connection with specific apparatus, it is to be clearly understood that this description is made only by way of example and not as a limitation to the scope of the invention as set forth in the objects thereof and in the accompanying claims.

What is claimed is:

1. A pattern display system for a cathode-ray tube whose face is scanned by an electron beam in a succession of spaced paths in synchronism with a radar antenna attitude, and transmitted radar pulses comprising: means for marking selected of said spaced paths, said paths being selected by their dependency upon the delay time from the path origin to the pattern as a multiple of a predetermined unit time plus a constant corresponding to the initial delay time for start of said pattern (where the multiple is any integer including zero and the constant is any fixed number including zero) each successive selected path in one scanning direction having one additional unit time of delay; first means for counting said selected paths and storing the delay time information as a multiple of the unit time plus said constant; means for generating pulses spaced a unit time apart commencing at the time of the beginning of each path sweep; second means for counting said pulses; a coincidence detection circuit for producing an output when the values in said first and second means for counting are equal to each other, and means responsive to said output for intensifying the electron beam.

2. A pattern display system as claimed in claim 1 further comprising means for resetting the last mentioned means for counting at the end of each sweep path and means for resetting the first mentioned means for counting at the end of a complete scan.

3. A pattern display system as claimed in claim 1 further comprising means for allowing only one intensification of the beam for each value of the first mentioned means for counting.

4. A pattern display system as claimed in claim 1 in which the means for marking the selected paths comprises: a light source; at least one photo-electric device in the path of light from said source; and a disc having slits therethrough, rotating in synchronism with the antenna attitude, between said source and said photo-electric device said first mentioned counting means being coupled to the output of the said photo-electric device.

5. A pattern display system for a cathode-ray tube whose face is scanned by an electron beam in a succession of spaced paths comprising: means for marking selected ones of said spaced paths, the marking of said selected paths being dependent upon the delay time from the path origin to the pattern as a multiple of a predetermined unit time plus a constant corresponding to the initial delay time for the start of said pattern (where the multiple is any integer including zero and the constant is any fixed number including zero); means for storing information representative of said constant and the said delay time as a multiple of the unit time for each selected path, a source of signals representing said unit time, means for storing signals from said source, and means responsive to the stored information and signals in said storing means for intensifying the electron beam along said selected paths at points corresponding to the pattern to provide said display.

References Cited by the Examiner

UNITED STATES PATENTS 2,741,761  4/56  Franke _____ 343—108

CHESTER L. JUSTUS, *Primary Examiner.*